United States Patent
Vincent et al.

(10) Patent No.: US 9,819,031 B2
(45) Date of Patent: Nov. 14, 2017

(54) MEMBRANE-ELECTRODES ASSEMBLY FOR PROTON EXCHANGE FUEL CELLS (PEMFC), AND MANUFACTURING METHOD

(71) Applicant: Commissariat A L'Energie Atomique Et Aux Energies Alternatives, Paris (FR)

(72) Inventors: Rémi Vincent, Grenoble (FR); Julien Tard, Saint Quentin Fallavier (FR); Denis Tremblay, Pommiers-la-Placette (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 15/258,199

(22) Filed: Sep. 7, 2016

(65) Prior Publication Data
US 2017/0018780 A1    Jan. 19, 2017

Related U.S. Application Data

(63) Continuation of application No. PCT/FR2015/050462, filed on Feb. 26, 2015.

(30) Foreign Application Priority Data

Mar. 21, 2014 (FR) ..................... 14 52396

(51) Int. Cl.
*H01M 8/10* (2016.01)
*H01M 4/88* (2006.01)
(Continued)

(52) U.S. Cl.
CPC ......... *H01M 4/8882* (2013.01); *H01M 4/881* (2013.01); *H01M 4/8892* (2013.01);
(Continued)

(58) Field of Classification Search
CPC ...................................................... H01M 8/10
See application file for complete search history.

(56) References Cited

U.S. PATENT DOCUMENTS

| | | |
|---|---|---|
| 2005/0112448 A1 | 5/2005 | Nakamura et al. |
| 2008/0107945 A1 | 5/2008 | Coms et al. |

(Continued)

FOREIGN PATENT DOCUMENTS

| | | |
|---|---|---|
| EP | 2 463 866 A2 | 6/2012 |
| EP | 2 618 414 A1 | 7/2013 |
| KR | 10-2013-0017496 A1 | 2/2013 |

OTHER PUBLICATIONS

A. Stassi, et al., "Performance Comparison of Long and Short-Side Chain Perfluorosulfonic Membranes for High Temperature Polymer Electrolyte Membrane Fuel Cell Operation," Journal of Power Sources, vol. 196, Issue 21, Nov. 1, 2011, pp. 8925-8930.
(Continued)

*Primary Examiner* — Jacob Marks
(74) *Attorney, Agent, or Firm* — Burr & Brown, PLLC

(57) ABSTRACT

A membrane-electrode assembly (MEA) including a membrane and two electrodes, and further at least one layer located at the interface of the membrane and of an electrode. The layer contains a proton conductive polymer which has a glass transition temperature lower than or equal to, advantageously lower than, that of the proton conductive polymer contained in the membrane.

10 Claims, 2 Drawing Sheets

(51) Int. Cl.
    H01M 8/1004    (2016.01)
    H01M 8/0202    (2016.01)

(52) U.S. Cl.
    CPC ....... H01M 8/0202 (2013.01); H01M 8/1004 (2013.01); Y02P 70/56 (2015.11)

(56) References Cited

U.S. PATENT DOCUMENTS

| | | |
|---|---|---|
| 2009/0233148 A1 | 9/2009 | Kim et al. |
| 2011/0097642 A1 | 4/2011 | Miyake et al. |
| 2012/0100463 A1 | 4/2012 | Hasegawa |
| 2013/0130133 A1 | 5/2013 | Jiang et al. |
| 2013/0288152 A1* | 10/2013 | Hasegawa ........... H01M 4/8814 429/482 |

OTHER PUBLICATIONS

Chao Lei, et al., "Low Equivalent Weight Short-Side-Chain Perfluorosulfonic Acid Ionomers in Fuel Cell Cathode Catalyst Layers," Journal of Power Sources, vol. 196, Issue 15, Aug. 1, 2011, pp. 6168-6176.

E.A. Ticianelli, et al., "Methods to Advance Technology of Proton Exchange Membrane Fuel Cells," Journal of the Electrochemical Society, vol. 135, Issue 99, Sep. 1988, pp. 2209-2214 (Abstract Only).

M. Prasanna, et al., "Effects of MEA Fabrication Method on Durability of Polymer Electrolyte Membrane Fuel Cells," Electrochimica Acta, vol. 53, No. 16, Jun. 30, 2008, 5434-5441 (Abstract Only).

Qingfeng Li, et al., "Approaches and Recent Development of Polymer Electrolyte Membranes for Fuel Cells Operational Above 100° C.: A Review," Chemistry of Materials, Dec. 9, 2003, vol. 15, No. 26, pp. 4896-4915 (Abstract Only).

International Search Report and Written Opinion (Application No. PCT/FR2015/050462) dated Jul. 10, 2015.

* cited by examiner

MEMBRANE-ELECTRODES ASSEMBLY FOR PROTON EXCHANGE FUEL CELLS (PEMFC), AND MANUFACTURING METHOD

DOMAIN OF THE INVENTION

The present invention relates to a membrane-electrode assembly for proton-exchange membrane fuel cells (PEMFC) having improved properties (performance, durability . . . ).

To achieve this, a so-called interface layer, based on a proton conductive polymer having a glass transition temperature lower than that of the membrane, is arranged at the interface of the membrane and of the electrode. Thus, an assembly performed at an adapted temperature provides a good membrane-electrode interface without affecting the integrity of the membrane.

BACKGROUND

The operating principle of a proton-exchange membrane fuel cell is based on the conversion of chemical energy into electric energy by catalytic reaction between a fuel, for example, hydrogen, and an oxidizer, for example, oxygen.

Membrane-electrode assemblies (MEA), commonly called cell cores, form the basic elements of PEMFCs. As illustrated in FIG. 1, the MEA is generally formed of a polymer membrane (electrolyte, 3) in contact with a catalytic layer (electrodes, 2) on both sides. The electrodes, respectively called anode and cathode, are thus separated by the electrolyte, which is an electronically-insulating, but proton conductive, medium. Current collectors (1) ensure the electron transfer at the external surface of the electrodes. Further, gas diffusion layers or GDLs are arranged on either side of the MEA to provide the electric conduction, the homogeneous distribution of the reactant gases, and the discharge of the produced water.

In the case of proton exchange membrane fuel cells, the electrolyte generally is a membrane made of a cation-exchange polymer, such as Nafion® (Dupont) or Aquivion® (Solvay).

The fuel used in proton-exchange membrane fuel cells may be a gas, such as hydrogen, or a liquid, such as for example alcohol, particularly ethanol, methanol, or also ethylene glycol.

The following reactions, given as an example, illustrate the electrochemical reactions occurring at the electrodes in the case where the fuel and the oxidizer respectively are hydrogen and oxygen:

Anode: $H_2 \rightarrow 2H^+ + 2e^-$     (1)

Cathode: $O_2 + 4H^+ + 4e^- \rightarrow 2H_2O$     (2)

$E°_{anode} = 0 \ V_{/ENH}$
$E°_{cathode} = 1.23 \ V_{/ENH}$

In this case, the general reaction thus is the following:

$H_2 + \frac{1}{2}O_2 \rightarrow H_2O \ E°_{eq} = E°_{cathode} - E°_{anode} = 1.23 \ V$ The electromotive force across the cell thus is 1.23 V in standard conditions.

At the anode, the decomposition of the hydrogen adsorbed on the catalyst generates protons $H^+$ and electrons $e^-$. The protons then cross the polymer membrane before reacting with oxygen at the cathode. The reaction of the protons with oxygen at the cathode results in the forming of water and in the production of heat.

Such electrochemical reactions are kinetically promoted by the presence of a catalyst forming the electrodes. Although a plurality of materials may be used according to the type of reaction and of fuel, platinum is the most efficient for most reactions and fuels.

As already indicated, the catalyst may appear in the form of catalytic layers, which are generally made of platinum nanoparticles supported on carbon clusters. The catalyst may be uniformly deposited by means of a catalytic ink on the membrane surface or on the diffusion layer. The catalytic ink is particularly made of the catalyst supported on carbon (platinum carbon), a carrier liquid, and a proton conductive polymer. The latter is generally of same nature as the electrolyte.

The proton-conducting polymer mainly plays a role in the cell performances, since it determines the proton conductivity of the cell. It is an ionomer, that is, a polymer having an ionized group allowing a charge transport.

Initially, the ionomers were sulfonated phenols, and then acid sulfonic polystyrene polymers, which are more mechanically resistant. Currently, perfluorosulfonic acid materials (PFSA) are widely used in current fuel cells, due to their good chemical and mechanical resistances.

PFSAs are ionomers derived from perfluorosulfonic acid, that is, comprising sulfonate groups $SO_3^-$. They further are fluorinated polymers.

This family of ionomers gathers a number of compounds, which differ by a slightly different chemistry. PFSA materials are commercialized under trade names Nafion® (Dupont), Aquivion® (Solvay), Flemion® (Asahi Glass Company), or Aciplex® (Asahi Chemical Company).

These polymers essentially differ by the chemical structure of their side or dangling chains, that is, the chains grafted on the main chain of the polymer (or branches).

Thus, the side or dangling chains of Aquivion® are shorter ("short side-chains") than those of Nafion® ("long side-chains"). This translates as a higher crystallinity rate and vitreous transition temperature.

The performances of MEAs, but also their durability, are determining for the commercialization of these devices. However, such MEAs, generally stacked, are submitted to chemical and mechanical degradations.

In terms of performance, there is a tendency to use thinner and thinner membranes to increase the proton conductivity. However, this goes along with a durability decrease due to a mechanical fragility of these membranes. Thus, the membranes are generally reinforced, for example, by polytetrafluoroethylene. MEAs may also be reinforced with polymer films placed on either side of the membrane. Still more elaborate technical solutions have been provided: As an example, document US 2013/0130133 describes a multi-layer membrane with a reinforced layer based on catalysts supported on nanofibers. Document US 2011/0097642 provides a membrane based on PFSA and on a so-called "basic" polymer. However, such solutions have the disadvantage of increasing the manufacturing cost.

Further, MEAs are generally assembled in a hot press. The temperature rise above the glass transition temperature of the proton conductive polymer present in the membrane and the electrodes enables to soften it, while the pressurizing allows an interpenetration and favors a good interface between the membrane and the electrodes. To achieve this, it is recommended to thermally treat the MEA at a 40° C. temperature higher than the glass transition temperature of the polymer which is present. In such conditions, the polymer of the electrolyte softens and favors a better contact with the electrodes, resulting in a more significant proton transfer between the electrodes, which enables to improve the performances of the electrochemical cell containing the MEA.

Typical assembly conditions have been described in document *Electrochemical Science and Technology* (J. Electrochem. Soc., 1988, 135, 9, p: 2209), that is, preheating the press to 100° C., arranging the assembly between the two plates of the press, raising the temperature to 120-176° C., and applying a 50-60 atm. pressure for 30-40 s.

However, the authors of publication "*Effects of MEA fabrication method on durability of polymer electrolyte membrane fuel cells*" (Volume 53, Issue 16, 30 Jun. 2008, Pages 5434-5441) have shown that an assembly in a hot press deteriorates the durability: a MEA assembled in a hot press (140° C., 200 kg·cm$^{-2}$, 1 min 30) is more degraded and thus less durable than a non-assembled MEA.

Thus, the softening of the electrolyte has the disadvantage of decreasing its mechanical resistance. Thereby, too high a pressure or a bad manipulation during its assembly with the electrodes may cause its piercing or its tearing, causing a performance degradation and a premature aging of the electrochemical cell. Current assembly conditions are thus a tradeoff between the forming of a good membrane-electrode interface, and the lowest possible thermal and mechanical stress to preserve the integrity of the membrane.

To minimize risks of tearing the electrolyte on assembly thereof, document EP 2 463 866 provides a low-pressure assembly method, which is however difficult to implement. Document KR 2013/0017496 provides an asymmetrical compression of the MEA during the stack assembly, with a compression rate advocated to be lower on the cathode side than on the anode side.

There thus is an obvious need for new technical solutions enabling to preserve the integrity of the membrane during its assembly in a MEA.

SUMMARY OF THE INVENTION

The present invention relates to a membrane-electrode assembly, currently called MEA, having improved properties (performance, durability . . . ) due to the presence of an interface layer between the membrane and the electrodes, based on a proton conductive polymer having a glass transition temperature lower than or equal to that of the proton conductive polymer of the membrane. Thus, during the temperature rise and the compression, the layer "melts" and penetrates into the porous electrodes, thus providing an improved membrane-electrode interface. The temperature applied during the assembly is however lower than or equal to the glass transition temperature of the proton conductive polymer forming the membrane, so that the integrity thereof is not affected.

More specifically, the present invention relates to a membrane-electrode assembly conventionally comprising one membrane and two electrodes, that is, an anode and a cathode, respectively. Typically, said assembly further comprises at least one layer, located at the interface of the membrane and of at least one electrode, containing a proton conductive polymer which has a glass transition temperature (Tg) lower than or equal to, advantageously lower than, that of the proton conductive polymer contained in the membrane.

The glass transition corresponds to a state change of a polymer or of a polymerized composite material, under the action of temperature, and causing significant variations of the mechanical properties thereof. The glass transition, correlated to the plastic transition, is characterized by a glass transition temperature (Tg).

Below this temperature, the polymer is called vitreous (solid state) and has the behavior of an elastic solid body. Above this temperature, it has a plastic solid behavior (viscoelastic state) due to the weakening of intermolecular links (Van der Waals force . . . ). Such a state change always goes along with a significant variation of the physical properties, particularly of the mechanical properties (drop of the Young's modulus, for example).

As known by those skilled in the art, a large number of physical properties (density, expansion coefficient, specific heat, elastic constants such as the Young's modulus, viscosity, thermal conductivity, refraction index, . . . ) may notably vary in the vicinity of the $T_g$ and may be used for the measurement thereof.

Preferably in the context of the present invention, the glass transition temperature ($T_g$) of the polymer or of the interface layer is determined by dynamic mechanical analysis (DMA) or by thermal analysis, in particular by differential scanning calorimetry (DSC).

In other words, the MEA according to the invention appears in the form of a multilayer comprising at least:
  one electrolyte membrane comprising a polymer noted P3;
  two electrodes comprising a polymer which may be the same or different in each of the electrodes, noted P2a (for the anode) and P2c (for the cathode). According to a preferred embodiment, the polymer present in the anode and the cathode is identical (P2);
  at least one layer comprising a polymer noted P4, where said layer may be located at the interface between the membrane and the anode and/or between the membrane and the cathode.

Generally, the assembly in a hot press is not an issue when the glass transition temperature of the polymer contained in the membrane is greater than that of the polymer contained in the electrodes, particularly when the Tg difference is greater than or equal to 40° C. Thus, when the membrane is made of Aquivion® (Tg in the order of 140° C.) and the electrodes are made of Nafion® (Tg in the order of 100° C.), the compression may be performed at a temperature in the range from 100° C. to 140° C., advantageously at 140° C. and provides a good membrane-electrode interface, without affecting the physical and thermal integrity of the membrane.

However, generally and according to a preferred embodiment of the invention, the membrane and the electrodes may comprise the same polymer. In this case, the temperature rise necessary to form the interface causes a degradation of the membrane.

The technical solution provided in the context of the invention comprises interposing a layer (called interface layer hereafter) based on a proton conductive polymer between the membrane and the electrode, said proton conductive polymer having a glass transition temperature lower than or equal to, advantageously lower than, that of the polymer contained in the membrane. Thus, on assembly and provided to perform it at a temperature smaller than or equal to, advantageously smaller than, the glass transition temperature of the polymer forming the membrane, it is possible to soften the interface layer and to ensure the penetration thereof into the electrode (to provide a good interface) without affecting the integrity of the membrane.

As mentioned, the interface layer comprises a proton conductive polymer. A proton conductive polymer is defined as a polymer favoring the displacement of protons ($H^+$) across the thickness of the materials that it forms. Indeed, in the case of a MEA, this layer should not interfere with the proton migration from the anode to the cathode through the membrane.

As described in relation with the proton conductive polymer present in the membrane and the electrodes, the polymer (P4) advantageously has an ionized group allowing charge transport, such as sulfonate groups $SO_3^-$.

According to another specific embodiment, said polymer also comprises fluorine atoms (F). In other words, it is a fluorinated polymer.

Polymers usable in the interface layer according to the invention are in particular perfluorosulfonic acid materials (PFSA)

As described in Li et al. (Chem. Mater. 15 (2003) 4896), this family comprises different polymers having a common structure of formula:

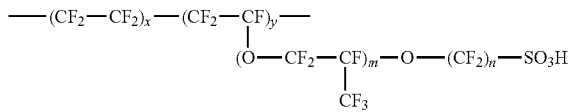

| Membrane | Structure | Producteur |
| --- | --- | --- |
| Nafion ® | m = 1; n = 2; x = 5-13.5; y = 1 | DuPont de Nemours |
| Dow ® | m = 0; n = 2; x = 3.6-10; y = 1 | Dow Chemicals |
| Aciplex ® | m = 0; n = 2-5; x = 1.5-14; y = 1 | Asahi Chemicals |
| Flemion ® | m = 0.1; n = 1-5; x = 5-13.5; y = 1 | Asahi Glass |

In known fashion, Nafion®-type polymers have a Tg in the order of 90-100° C.

In known fashion, Flemion®-type polymers have a Tg in the order of 120-125° C.

Further, the following polymers may be used:
an Aquivion®-type polymer (Solvay) with a Tg in the order of 140-150° C. and for example the following structure (k being an integer):

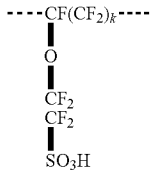

a 3M ionomer-type polymer with a Tg in the order of 125-130° C. and for example the following structure (k being an integer):

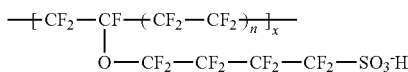

According to a specific embodiment, the interface layer according to the invention may be only formed of said polymer, or even of a mixture of polymers, all these polymers having the above-mentioned proton conduction and glass transition temperature characteristics.

More generally, the interface layer according to the invention may comprise one or a plurality of layers each comprising identical or different proton conductive polymers having the above-mentioned proton conduction and glass transition temperature characteristics.

Advantageously, the interface layer according to the invention is a continuous layer.

Preferably, the interface layer according to the invention has a thickness smaller than 10 micrometers, advantageously in the range from 1 to 5 micrometers, advantageously equal to 2 micrometers. As will be discussed hereafter in relation with the manufacturing method according to the invention, this layer may penetrate into the electrode thickness, particularly due to the compression.

According to a preferred feature of the invention and as already mentioned, the proton conductive polymer contained in the interface layer has a glass transition temperature smaller than or equal to, advantageously smaller than, that of the polymer contained in the membrane. According to a preferred embodiment, the temperature difference is greater than or equal to 20° C., advantageously greater than 20° C., or even greater than or equal to 40° C.

In this specific case of PFSAs, the glass transition temperature is known to be correlated to the length of the side or dangling chain. Thus, and according to a specific embodiment, the polymer of the interface layer and the polymer of the membrane are PFSAs, the polymer of the interface layer having a longer dangling chain than the membrane polymer. More advantageously still, the polymer of the electrodes is also a PFSA having a dangling chain shorter than that of the polymer of the interface layer. To assess the "length", the total number of atoms forming this chain, or possibly the number of carbon atoms of this chain, may be taken into account.

In the meaning of the invention, a perfluorosulfonic ionomer designates a perfluorinated polymer supporting sulfonic acid functions, or PFSA, as defined hereabove.

As an illustration, and based on the PFSA polymers currently used in the context of PEMFCs, that is, Nafion® (Tg in the order of 100° C.), Aquivion® (Tg in the order of 140° C.), and Flemion® (Tg in the order of 125° C.), the following combinations may be envisaged:
membrane=Aquivion®; interface layer=Aquivion®, advantageously Flemion® (ΔT=15° C.), more advantageously Nafion® (ΔT=40° C.);
membrane=Flemion®; interface layer=Flemion®, advantageously Nafion® (ΔT=25° C.);
membrane=Nafion®; interface layer=Nafion®.

As already mentioned, the assembly in a hot press is really an issue when the glass transition temperature of the polymer of the membrane is lower than or equal to, often equal to, that of the polymer of the electrodes.

Thus, and according to another specific embodiment, the glass temperature of the proton conductive polymer contained in the interface layer is lower than or equal to that of the proton conductive polymer contained in the electrode(s). According to a preferred embodiment, the temperature difference is greater than or equal to 20° C., advantageously greater than 20° C., or even greater than or equal to 40° C.

As an illustration, and based on the PFSA polymers currently used in the context of PEMFCs, that is, Nafion® (Tg in the order of 100° C.), Aquivion® (Tg in the order of 140° C.), and Flemion® (Tg in the order of 125° C.), the following combinations may be envisaged:
membrane=Aquivion®; interface layer=Flemion® (ΔT=15° C.), advantageously Nafion® (ΔT=40° C.); Electrodes=Aquivion® or Flemion®;
membrane=Flemion®; interface layer=Nafion® (ΔT=25° C.); Electrodes=Flemion®;

membrane=Flemion®; interface layer=Flemion®, advantageously Nafion® ($\Delta T=25°$ C.); Electrodes=Aquivion®;

membrane=Nafion®; interface layer=Nafion®; Electrodes=Flemion® or Aquivion®.

Thus, and according to a specific embodiment, the polymer of the interface layer according to the invention has a glass transition temperature in the range from 90 to 100° C. and the membrane polymer, and possibly the electrode polymer, has a glass transition temperature in the range from 140 to 150° C.

In a specific case, the membrane and advantageously the electrodes comprise an Aquivion®-type polymer, for example having the following structure:

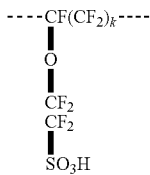

In this context, a particularly adapted ionomer is a tetrafluoroethylene and Sulfonyl Fluoride Vinyl copolymer, for example, sold under trade name Aquivion® (Solvay), particularly under number CAS 111173-25-2.

Further, the layer present at the interface of the membrane and of at least one electrode, advantageously of the two electrodes, comprises a Nafion®-type polymer, for example, having the following structure:

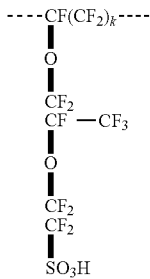

In this context, a particularly adapted ionomer is a sulfonated tetrafluoroethylene derivative, for example sold under trade name Nafion® (Dupont). As an example, product Nafion® D2020 having number CAS 31175-20-9 may be used in the framework of the present invention, but others exist, such as for example Nafion® D520. These advantageously are dispersions in a water/alcohol phase.

Conventionally, the membrane exclusively comprises proton conductive polymer and has a thickness in the range from 5 to 100 micrometers, advantageously in the order of 20 micrometers.

In the context of the invention, the MEA also comprises an active layer or catalytic layer comprising the catalyst. The active or catalytic layer is used as an electrode, as well as a cathode as an anode.

Advantageously, the catalyst is platinum. Further, the catalyst advantageously appears in the form of particles or even of nanoparticles, particularly of platinum.

According to another preferred embodiment, the catalyst is supported on carbon or on carbon clusters. The catalyst may thus be platinum carbon.

An active layer in the MFA according to the invention comprises a catalyst, advantageously platinum nanoparticles on a carbonaceous support, typically made of 50% of carbon and of 50% of platinum (% by mass in the dry catalytic layer). Conventionally and as an example, the active layer may be formed of from 66% to 88% in dry weight of catalyst, advantageously, 72%, and from 22% to 34% in dry weight of proton conductive polymer(s), advantageously 28%.

Advantageously, the catalytic layer may be obtained by deposition of a catalytic ink, particularly on the gas diffusion layer (GDL).

Conventionally, the catalytic ink comprises, in addition to the proton conductive polymer(s) and the catalyst, advantageously platinum nanoparticles on a carbonaceous support, a solvent, or a carrier fluid.

As known by those skilled in the art, such a catalytic ink may be deposited by printing methods such as coating, spraying, inkjet, or silk-screening.

Such an active or catalytic layer, playing the role of electrodes in the MEA according to the invention, advantageously has a thickness in the order of 10 micrometers and a mass in the range from 0.2 to 4 mg/cm$^2$, for example, 1.2 mg/cm$^2$.

According to an embodiment, the ratio of the thickness of the interface layer to that of the membrane is in the range from 5 to 20%, advantageously in the order of 10%.

A MEA according to the invention may be used in the forming of electrochemical devices, such as fuel cells and more particularly proton-exchange membrane fuel cells (PEMFC).

A MEA according to the invention may be used to form an electrochemical electrode, advantageously comprising a gas diffusion layer (GDL), generally made of carbon fibers, arranged on either side of the active layer.

Thus, the present invention also aims at electrochemical devices comprising a MEA according to the invention. The targeted electrochemical devices comprise, first and foremost, fuel cells and more particularly proton-exchange membrane fuel cells (PEMFC). Such cells may be formed of stacked electrochemical cells.

As shown in the context of the present application, a MEA according to the invention enables to improve the properties of a PEMFC-type fuel cell.

In the context of the invention, "properties" designates the performances as well as the durability.

In the context of the invention, the electrochemical performances of a cell comprising a MEA according to the invention are measured by following the voltage delivered according to the current. This test is generally implemented in conditions desirable in the automobile field (Temperature: 80° C.; 50% of relative humidity; Pressure: 1.5 bar) but may be adapted to the operating conditions envisaged for the involved electrochemical device. In particular, and in the context of the invention, improved performances in drowning conditions have been observed (Temperature: 80° C.; 100% of relative humidity; Pressure: 1.5 bar) indicating a better management of the water generated by the cell.

A positive effect on the durability of electrochemical devices according to the invention is also expected.

According to another aspect, the present invention relates to a MEA manufacturing method such as defined hereabove.

Such a method advantageously comprises the steps of:
- depositing on at least one of the surfaces of the membrane and/or of the electrodes a layer containing a proton conductive polymer;
- assembling the membrane and the electrodes;
- raising the temperature of the assembly to a temperature higher than or equal to the glass transition temperature of the polymer of the layer but lower than or equal to the glass transition temperature of the membrane polymer;
- possibly pressurizing the assembly.

The first step thus comprises depositing the layer which will be used as an interface layer between the membrane and the electrode.

This layer may be deposited on:
- a surface of the membrane;
- both surfaces of the membrane;
- a surface of an electrode;
- a surface of each of the two electrodes.

Advantageously, the deposition is performed on a surface of each of the two electrodes.

According to a specific embodiment and prior to this, the electrode is deposited on a gas diffusion layer. The catalytic ink used for the deposition advantageously comprises:
- a catalyst, advantageously platinum nanoparticles on a carbonaceous support, typically made of 50% of carbon and of 50% of platinum (% by mass in the dry catalytic layer);
- at least one ionomer such as defined hereabove in terms, in particular, of glass transition temperature; and
- a solvent or carrier liquid.

As known by those skilled in the art, such a catalytic ink may be deposited by printing methods such as coating, spraying, inkjet, or silk-screening.

Conventionally and as an example, the active layer obtained on the GDL after drying may be formed of from 66% to 88% by dry weight of catalyst, advantageously, 72%, and from 22% to 34% by dry weight of proton conductive polymer(s), advantageously 28%.

Such an active or catalytic layer, playing the role of electrodes in the MEA according to the invention, advantageously has a thickness in the range from 2 to 20 micrometers, for example, in the order of 10 micrometers, and a mass in the range from 0.2 to 4 mg/cm$^2$, for example, in the order of 3 mg/cm$^2$.

According to another specific embodiment, before the assembly and advantageously before the deposition of the interface layer, the electrodes are submitted to a thermal treatment, advantageously at a temperature greater than or equal to the glass transition temperature of the polymer contained in these electrodes. The difference between these temperatures is advantageously greater than or equal to 20° C., or even greater than or equal to 40° C.

Thus, and as an example, when the electrodes contain Aquivion® having a glass transition temperature in the range from 140 to 150° C., they are submitted to a thermal treatment at a temperature greater than 140° C., advantageously in the order of 180° C. Such a treatment may last for from several minutes to several hours, typically 30 minutes.

The deposition of the interface layer is advantageously performed by conventional spraying, coating, or silk-screening techniques. A spraying method is advantageously implemented.

Advantageously, a dispersion comprising the proton conductive polymer having the desired properties is implemented. More advantageously still, it is an aqueous dispersion.

Advantageously, the thickness of the interface layer should be in the range from 1 to 5 micrometers, that is, a polymer mass in the range from 0.2 to 1 mg.

The ratio of the thickness of the interface layer to that of the active layer is advantageously in the range from 5 to 20%, for example, in the order of 10%.

The second step of the method according to the invention comprises placing opposite each other and then in contact with each other the membrane surface and the electrode surface so that the layer deposited on the membrane or on the electrode is at the membrane/electrode interface and can thus be used as a bonding layer.

The stack thus obtained can thus correspond to the next cases:
- Anode-layer-membrane-cathode;
- Anode-membrane-layer-cathode;
- And advantageously anode-layer-membrane-layer-cathode.

As already mentioned, the stack may also comprise GDLs on either side of the electrodes.

The next step comprises taking the stack or assembly described hereabove to a temperature higher than or equal to the glass transition temperature of the polymer of the layer, but lower than or equal to the glass transition temperature of the polymer of the membrane, or even than that of the electrode.

To favor the interface, the temperature should be as high as possible without for all this affecting the integrity of the membrane and thus at most equal to the glass transition temperature of the polymer contained in the membrane. It should at least be equal to the glass transition temperature of the polymer contained in the interface layer.

In practice and in the case where the electrodes and the membrane contain Aquivion® and where the interface layer is made of Nafion®, the stack should be submitted to a thermal treatment at a temperature in the range from 90 to 100° C. (Tg of Nafion®) and from 140 to 150° C. (Tg of Aquivion®), advantageously at 140° C.

Such a thermal treatment is applied for a time period from 10 to 300 s, for example, for 3 minutes. This time period may depend on the polymers present, on the thicknesses of the layers present, on the applied temperature . . . .

Simultaneously or subsequently, a pressure is advantageously exerted on the stack or the assembly, to favor the penetration of the interface layer into the electrode(s). A pressure in the range from 1 to 5 MPa, for example equal to 3.5 MPa, is advantageously exerted for a time period which may range from 1 second to several minutes, for example, 3 minutes.

In practice, the thermal treatment and the pressurizing are advantageously carried out in a hot press.

Apart from the fact of ensuring the connection between the membrane and the electrodes, the interface layer thus enables to preserve the physical and thermal integrity of the membrane.

BRIEF DESCRIPTION OF THE DRAWINGS

The foregoing features and advantages will now be discussed in the following non-limiting description of a specific embodiment, in relation with the accompanying drawings, among which.

EXAMPLES OF EMBODIMENT

Figure 1:
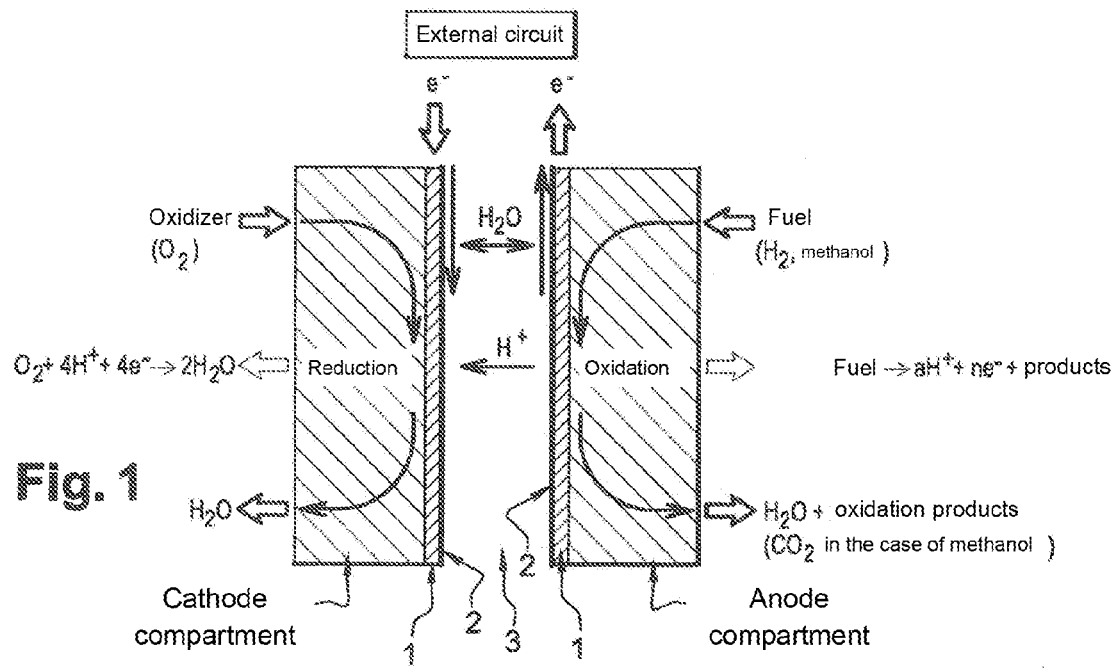
FIG. 1 shows the diagram of the operating principle of a PEMFC-type fuel cell.

The present invention will be further illustrated in relation with a specific embodiment, that is, a MEA comprising:
an Aquivion®-type membrane (3);
As a reminder, Aquivion®, for example, commercialized by Solvay, has a glass transition temperature, noted Tg, in the range from 140 to 150° C. and the following structure (k being an integer):

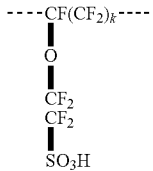

an anode and a cathode (2) also comprising Aquivion®. The electrodes typically contain:
1/ 72% of platinum-type catalyst dispersed on a carbonaceous support, for example, carbon black. The assembly is formed of 50% of platinum and of 50% of carbon;
2/ 28% of ionomer, in the case in point, Aquivion®.
The % should be understood as mass percentages in the dry catalytic layer:
a Nafion®-based layer (4);
As a reminder, Nafion®, for example, commercialized by Dupont, has a glass transition temperature, noted Tg, in the order of 90-100° C. and the following structure (k being an integer):

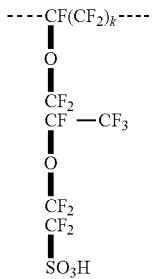

1/ Forming of the Device According to the Invention:
A/ Electrode Forming:
The first step comprises preparing a catalytic ink comprising the polymer, in the case in point Aquivion®, and the carbonaceous support in a solvent. A water-based catalytic ink is thus prepared to obtain the above-mentioned concentrations. According to the manufacturing method, the dry extract varies from 1 to 20%. A thermal treatment enables to dry the deposited ink.

Thus, the second step is the manufacturing of the electrodes (2) by deposition of the ink on the gas diffusion layers (5), typically formed by coating (or inkjet, silk-screening, spraying), thus forming the GDE.

The GDE thus formed, based on Aquivion®, having a Tg of 140-150° C., is then submitted to a thermal treatment at 180° C. for 30 minutes so that the ionomer particles coalesce, which favors the forming of triple contact areas necessary for a good catalytic operation. It should be noted that this step is not necessary in the conventional assembly manufacturing method, since this high-temperature treatment is carried out at the time of the assembly of the electrodes with the membrane.

The electrodes (2) thus formed typically have a thickness in the order of 10 μm with a mass in the order of 3 mg/cm$^2$.

B/ Forming of the Interface Layer:
The next step comprises depositing the interface layer (4) on at least one of the electrodes (2), advantageously on the two electrodes.

According to the invention, this layer is formed of an ionomer having a glass transition temperature lower by at least 20° C. than that contained in the membrane and in the case in point in the electrodes (Aquivion® having a Tg of 140-150° C.). The ionomer selected to form the interface layer (4) is an ionomer from Dupont's Nafion® range, advantageously in the form of an aqueous dispersion. Thus, the water/alcohol phase Nafion D2020 and Nafion D520 dispersions may be used to form the layer.

In practice, the dispersion is deposited on the "free" surface of the electrode, that is, on the surface which is not in contact with the GDL (5) and which will be the surface placed opposite the membrane (3). The deposition may be performed by different conventional techniques such as spraying, coating, silk-screening. In practice, a spraying process is advantageously implemented.

The interface thickness is typically in the range from 1 to 5 micrometers, advantageously 2 micrometers. In practice, during the deposition and the drying, the ionomer of the interface layer penetrates into the active area.

The interface thickness should be in the range from 1 to 5 μm, that is, a mass in the range from 0.2 to 1 mg. The Nafion D2020 suspension having a 22% dry extract, the wet mass to be deposited is thus in the range from 0.908 to 4.540 mg, per cm$^2$ of active area.

C/ Assembly:
The electrode surface comprising the interface layer is then placed opposite the Aquivion® membrane (3) to form the assembly.

The compression of the assembly is performed in a hot press in the following conditions:
at a temperature higher than the Tg of the polymer of interface layer 4 (90-100° C.) but lower than that of the polymers forming the electrodes (2) and the membrane (3) (140-150° C.). According to another constraint, to provide a good membrane-electrode interface, the assembly should advantageously be performed at a temperature higher by 40° C. than the glass transition temperature of the polymer present. In the case in point, a temperature in the range from 100° C. to 140° C., advantageously higher than 120° C., or even just lower than 140° C., should thus be applied:
at a pressure typically in the range from 1 to 5 MPa, for example, 3.5 MPa;
for a time period capable of ranging from a few seconds to a few minutes, for example, 3 minutes.

Figure 2:
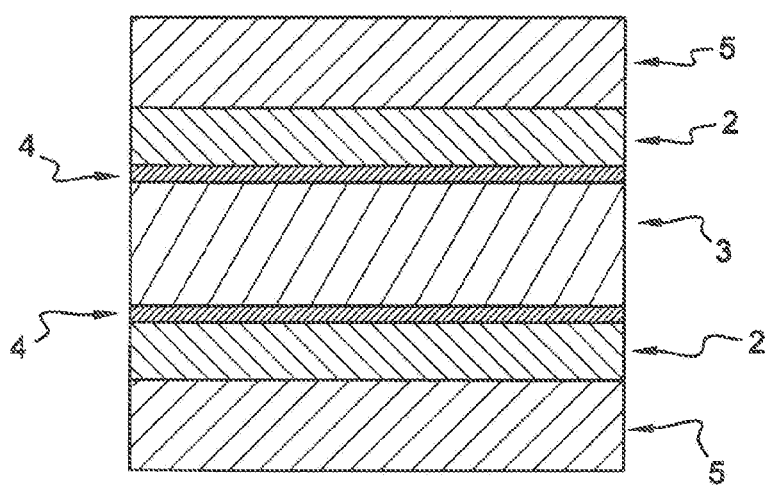
FIG. 2 shows a MEA according to the invention.

At the end of the assembly, the stack has a structure such as schematized in FIG. 2. Such a structure (apart from the GDL), dry and finished, typically has a thickness in the ranee from 20 to 50 micrometers.

2/ Performance of the Device According to the Invention:
The MEA thus obtained is mounted in a single cell to test the performances. The single cell is fitted with monopolar plates allowing the arrival of gases, with current collection plates, and with clamping plates.

The performance of the device according to the invention has been compared with that of a reference MEA (formed of Nafion® compressed at 135° C.), in two different conditions:

in conditions close to those recommended for an automobile use: operating temperature=80° C.; relative humidity=50%; gas pressure=1.5 bar.

in drowning conditions: operating temperature=80° C.: relative humidity=100%; gas pressure=1.5 bar.

Figure 3:
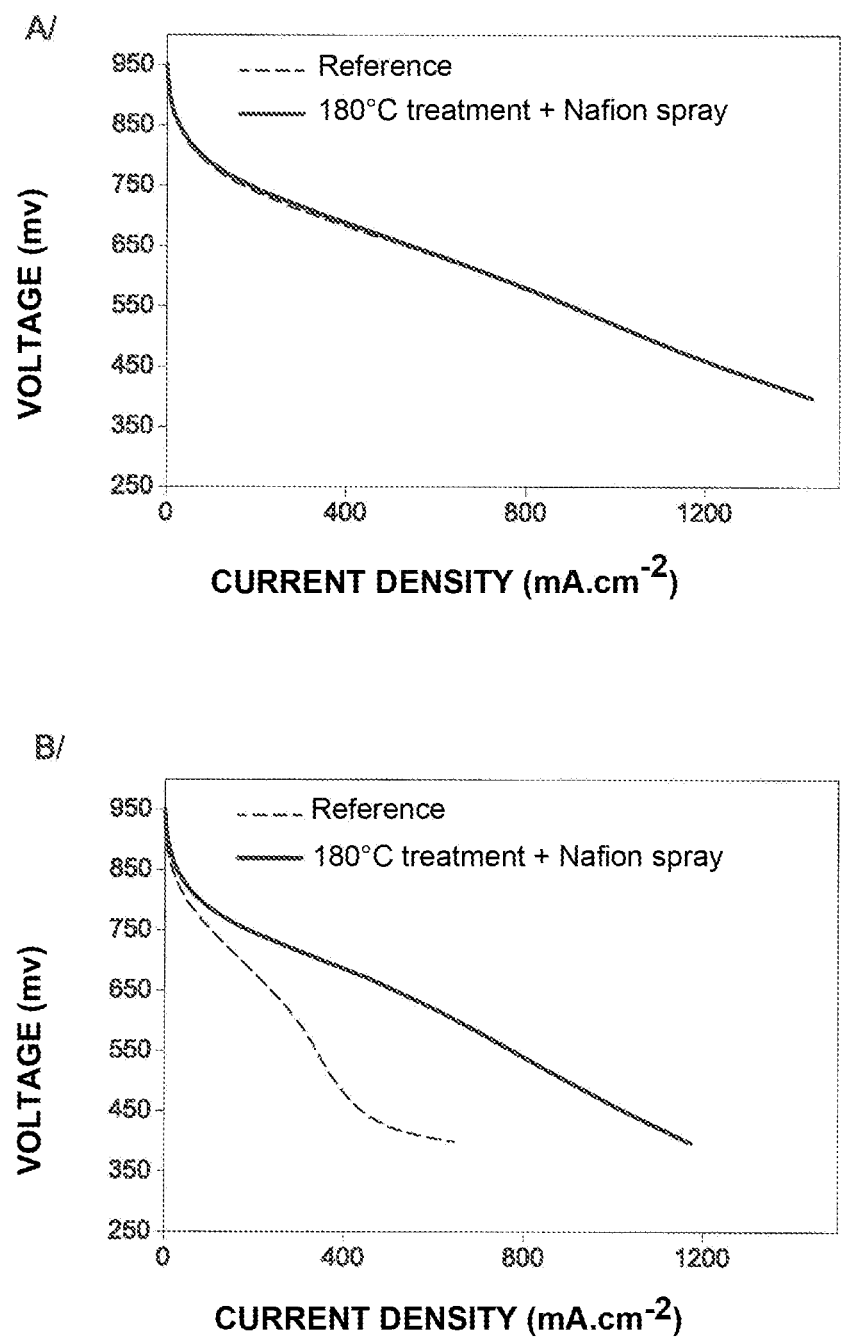
FIG. 3 compares the performances of a device according to the invention and of a device according to prior art in automobile conditions (A) and in drowning conditions (B).

The results, disclosed in FIG. 3, correspond to a voltage-vs.-current density curve representative of the cell performance. The performance gain is particularly significant in drowning conditions. Thus, the optimizing of the membrane-electrode interface in a compressed MEA, such as provided in the context of the invention, provides a better management of the water generated by the cell.

An improvement of the cell durability is also expected.

The invention claimed is:

1. A membrane-electrode assembly (MEA) comprising a membrane and two electrodes, said assembly further comprising at least one layer located at the interface of the membrane and of an electrode, wherein:

the membrane and the electrodes contain a same proton conductive polymer;

said layer contains a proton conductive polymer which has a glass transition temperature lower than that of the proton conductive polymer contained in the membrane and in the electrodes;

the proton conductive polymers contained in the membrane and the electrodes and in the layer are perfluorosulfonated ionomers (PFSA).

2. The membrane-electrode assembly (MEA) of claim 1, wherein the polymer of the layer has a longer dangling chain than the polymer of the membrane and of the electrodes.

3. The membrane-electrode assembly (MEA) of claim 1, wherein the difference between the glass transition temperatures of the polymer of the layer and of the polymer of the membrane and of the electrodes is greater than or equal to 20° C., advantageously greater than 20° C.

4. The membrane-electrode assembly (MEA) of claim 3, wherein the polymer of the layer has a glass transition temperature in the order of 100° C. and the polymer of the membrane and of the electrodes has a glass transition temperature in the order of 140° C.

5. The membrane-electrode assembly (MEA) of claim 1, wherein the polymer of the layer has the following structure:

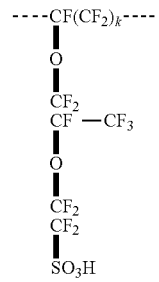

and the polymer of the membrane and of the electrodes has the following structure:

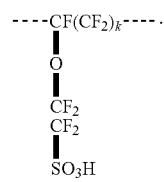

6. The membrane-electrode assembly (MEA) of claim 1, wherein the layer has a thickness in the range from 1 to 5 micrometers, advantageously equal to 2 micrometers.

7. A fuel cell (PEMFC) comprising the membrane-electrode assembly (MEA) of claim 1.

8. A method of manufacturing the membrane-electrode assembly (MEA) of claim 1, comprising the steps of:

depositing on at least one of the surfaces of the membrane and/or of the electrodes a layer containing a proton conductive polymer;

assembling the membrane and the electrodes;

raising the temperature of the assembly to a temperature higher than or equal to the glass transition temperature of the polymer of the layer but lower than or equal to the glass transition temperature of the polymer of the membrane and of the electrodes;

possibly pressurizing the assembly.

9. The membrane-electrode assembly (MEA) manufacturing method of claim 8, wherein the layer is deposited on one of the surfaces of the two electrodes, the assembly being formed by placing opposite each other the layer deposited on the electrodes and the membrane.

10. The membrane-electrode assembly (MEA) manufacturing method of claim 8, wherein, before the assembly, advantageously before the deposition of the layer, the electrodes are submitted to a thermal treatment, advantageously at a temperature higher than or equal to the glass transition temperature of the polymer contained in the electrodes.

* * * * *